US012073632B2

(12) United States Patent
Chen et al.

(10) Patent No.: US 12,073,632 B2
(45) Date of Patent: Aug. 27, 2024

(54) STRUCTURAL OBJECT DETECTOR FOR HIERARCHICAL ONTOLOGY FOR TRAFFIC LIGHT HANDLING

(71) Applicant: TOYOTA RESEARCH INSTITUTE, INC., Los Altos, CA (US)

(72) Inventors: Kun-Hsin Chen, Mountain View, CA (US); Dennis I. Park, Fremont, CA (US); Jie Li, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 115 days.

(21) Appl. No.: 16/872,095

(22) Filed: May 11, 2020

(65) Prior Publication Data

US 2021/0350152 A1    Nov. 11, 2021

(51) Int. Cl.
*G06V 20/58*    (2022.01)
*G06F 18/21*    (2023.01)
*G06F 18/214*    (2023.01)
*G06N 20/00*    (2019.01)

(52) U.S. Cl.
CPC ........ *G06V 20/584* (2022.01); *G06F 18/2148* (2023.01); *G06F 18/217* (2023.01); *G06N 20/00* (2019.01)

(58) Field of Classification Search
CPC ........................... G06K 9/00825; G06N 20/00
See application file for complete search history.

(56) References Cited

U.S. PATENT DOCUMENTS

| | | | |
|---|---|---|---|
| 9,378,643 B2 | 6/2016 | Huelsen | |
| 9,384,187 B2 | 7/2016 | Verma | |
| 9,442,487 B1 * | 9/2016 | Ferguson | G05D 1/0231 |
| 10,852,743 B2 * | 12/2020 | Creusot | G06K 9/00825 |
| 2008/0137908 A1 * | 6/2008 | Stein | G06V 20/582 382/103 |
| 2013/0077830 A1 * | 3/2013 | Liu | G06V 20/582 382/104 |
| 2017/0024622 A1 * | 1/2017 | Mizutani | G06K 9/00825 |
| 2017/0262709 A1 * | 9/2017 | Wellington | G06V 10/764 |
| 2018/0144203 A1 * | 5/2018 | Moosaei | G06K 9/00825 |
| 2018/0300567 A1 * | 10/2018 | Qin | G06K 9/00825 |
| 2018/0349717 A1 * | 12/2018 | Yamanoi | G08G 1/16 |
| 2019/0332875 A1 * | 10/2019 | Vallespi-Gonzalez | G06F 16/29 |
| 2020/0050879 A1 * | 2/2020 | Zaman | G06T 5/50 |
| 2020/0055524 A1 * | 2/2020 | Lacaze | G05D 1/0088 |
| 2020/0081450 A1 * | 3/2020 | Creusot | G08G 1/09623 |
| 2020/0135030 A1 * | 4/2020 | Krivokon | G08G 1/0145 |
| 2020/0410263 A1 * | 12/2020 | Gao | G01S 17/931 |

(Continued)

*Primary Examiner* — Wen W Huang
(74) *Attorney, Agent, or Firm* — SHEPPARD, MULLIN, RICHTER & HAMPTON LLP; Daniel N. Yannuzzi

(57) ABSTRACT

Systems and methods are provided for developing/leveraging a hierarchical ontology in traffic light perception. A hierarchical ontology representative of various traffic light characteristic (e.g., states, transitions, colors, shapes, etc.) allow for structured and/or automated annotation (in supervised machine learning), as well as the ability to bootstrap traffic light prediction. Further still, the use of a hierarchical ontology provides the ability to accommodate both coarse and fine-grained model prediction, as well as the ability to generate models that are applicable to different traffic light systems used, e.g., in different geographical regions and/or contexts.

17 Claims, 8 Drawing Sheets

(56) References Cited

U.S. PATENT DOCUMENTS

2021/0179133 A1\* 6/2021 Yetukuri ............ G08G 1/09623
2021/0201057 A1\* 7/2021 Lin ...................... G06K 9/3233

\* cited by examiner

STRUCTURAL OBJECT DETECTOR FOR HIERARCHICAL ONTOLOGY FOR TRAFFIC LIGHT HANDLING

TECHNICAL FIELD

The present disclosure relates generally to developing and training machine learning models for traffic light detection.

DESCRIPTION OF RELATED ART

Traffic light handling or perception is a fundamental capability required in autonomous driving, especially in urban environments, where traffic lights can be encountered rather frequently, e.g., every block. In order for autonomous vehicles, or even vehicles using assisted driving systems, e.g., advanced assisted driving systems (ADAS), to traverse roadways with traffic lights, those traffic lights must be accurately perceived so that the traffic flow they control can progress properly.

BRIEF SUMMARY OF THE DISCLOSURE

In accordance with one embodiment, a method may comprise detecting, from a plurality of images, evidence of one or more traffic signals. Each of the plurality of images can be labeled with one or more labels indicative of one or more characteristics and operating conditions of the one or more traffic signals in accordance with a hierarchical ontology representative of the one or more characteristics and operating conditions. A traffic signal recognition model can be trained with the labeled images.

In one embodiment, the hierarchical ontology comprises a plurality of stages.

In one embodiment, the plurality of stages comprises at least a boundary stage, and multiple bulb state stages. In one embodiment, the boundary stage corresponds to the detection of the evidence of the one or more traffic signals. In one embodiment, the multiple bulb state stages comprises at least a color state, a geometry state, and a flashing state.

In one embodiment, one or more of each bulb state stage of the multiple bulb state stages comprises a plurality of bulb state groups.

In one embodiment, the labeling of each of the plurality of images comprises auto-labeling of at least a subset of the plurality of images based on labels regarding preceding stages of the plurality of stages.

In one embodiment, the method further comprises validating a label associated with a later stage of the hierarchical ontology based on a label associated with an earlier stage of the hierarchical ontology.

In one embodiment, the method further comprises operationalizing the traffic signal perception model to generate traffic signal state predictions regarding encountered traffic signals during operation of a vehicle in which the traffic signal recognition model is implemented.

In one embodiment, the method further comprises validating the traffic signal state predictions with the labeling of one or more of plurality of images.

In accordance with another embodiment, a vehicle includes a traffic light recognition system comprising a camera and a traffic light estimator circuitry. The traffic light estimator circuitry can be controlled by a control unit operative to: receive images from the camera; and analyze the received images in accordance with a traffic light recognition model trained using labeled images, the labeled images comprising one or more labels indicative of one or more characteristics and operating conditions of the one or more traffic lights in accordance with a hierarchical ontology representative of the one or more characteristics and operating conditions.

In one embodiment, the hierarchical ontology comprises a plurality of stages comprising at least a boundary stage, and multiple bulb state stages.

In one embodiment, the boundary stage corresponds to the detection of the evidence of the one or more traffic signals.

In one embodiment, the multiple bulb state stages comprises at least a color state, a geometry state, and a flashing state.

In one embodiment, the traffic light state predictions are validated with the labeling of one or more of plurality of images.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
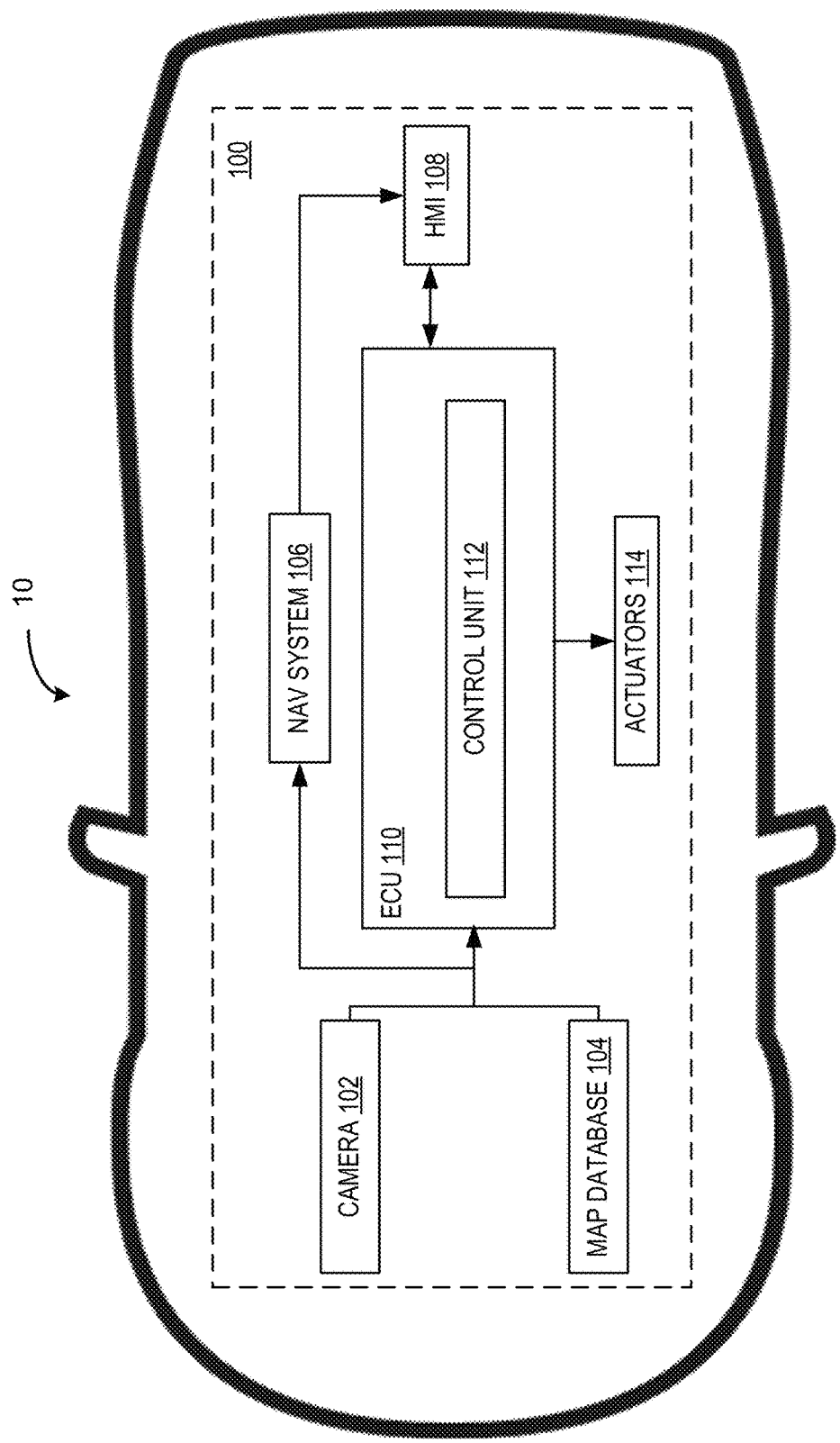
FIG. 1 illustrates an example vehicle with which data for training a traffic light perception model may be captured and in which traffic light perception may be performed.

The figures are not exhaustive and do not limit the present disclosure to the precise form disclosed.

DETAILED DESCRIPTION

As alluded to above, vehicles such as autonomous vehicles and ADAS-equipped vehicles should be able to accurately perceive traffic lights encountered on roadways that such vehicles traverse. One way to address traffic light perception can be to employ machine learning to train models so that the models will be able to accurately perceive different traffic light states, for example. However, conventional traffic light perception models are often premised on over-simplified traffic light ontologies. For example, the operation of a traffic light may be summarized as merely a single categorical label, e.g., "traffic light" having two states, "go" and "no go" in conventional systems and approaches. Moreover, attempting to model traffic lights with states "flattened" into a one-label ontology could result in 50 to 60 classes that would be burdensome to process.

Accordingly, various embodiments of the present disclosure described herein are directed to a hierarchical ontology and its use in traffic light perception. The use of a hierarchical ontology to represent various traffic light characteristic (e.g., states, transitions, colors, shapes, etc.) allow for structured and/or automated annotation (in supervised machine learning), as well as the ability to bootstrap traffic light prediction. Further still, the use of a hierarchical ontology provides the ability to accommodate both coarse and fine-grained model prediction, as well as the ability to generate models that are applicable to different traffic light systems used, e.g., in different geographical regions and/or contexts. The models generated using such a hierarchical ontology can also encode richer information, which can improve detection and classification performance. Thus, the amount of data collection can be reduced, and data collected in one region may have applicability in another region. Additionally still, the size of traffic light models can be reduced when modeling more complicated traffic light systems because the same or at least some of the same aspects of a structured model can be used universally.

The hierarchical ontology structures traffic light characteristics, e.g., states, conditions, color, geometry, etc., and thus decomposes traffic light perception into multiple levels. Generated models may then assist with the development of training data sets related to traffic lights. For example, a hierarchical ontology may, at its highest level, represent go (straight)/no go (straight) states, at a next level down, represent bulb color state (green/yellow/red), at a next level down, represent bulb geometry type (round/arrow), and so on. Accordingly, the aforementioned bootstrapping of traffic light prediction can be achieved because if a traffic light state is detected/labeled as go (straight), the bulb color state cannot be red, for example. Moreover, the annotation pipeline can be split into multiple stages to reduce the error rate. Moreover, detectors can be forced to learn the correct correlation between different levels, e.g., traffic light detection (go (straight)/no go (straight)) and bulb geometry detection. Further still, as noted above, automatic labeling/annotation of, e.g., different states, e.g., bulb color state, can be effectuated. For example, if a traffic light is detected to be in a go straight state, and a corresponding bulb's geometry state is, e.g., solid/round, a human labeler need not be relied upon to annotate the bulb's color state. This is because the model will know that the bulb color state must be green to correspond to the other detected/annotated states. Thus, annotation of the bulb color state in this example can be accomplished with an automatic labeling/annotation function.

It should be understood that the terms "traffic light(s)" and "traffic signal(s)" may be used interchangeably in the present disclosure. A traffic light/signal can refer to any signaling device positioned at road intersections, pedestrian crossings, and other locations for controlling the flow of vehicular traffic. Although various embodiments are described in the present disclosure in the context of automotive vehicles/traffic, various embodiments have applicability in other contexts where traffic light perception is needed or performed.

FIG. 1 illustrates an example vehicle 10 that may necessitate the ability to handle/perceive traffic lights, such as an autonomous vehicle, mapping vehicle, etc. It should be understood that various embodiments disclosed herein may be applicable to/used in various vehicles (internal combustion engine (ICE) vehicles, fully electric vehicles (EVs), etc.) that are fully or partially autonomously controlled/operated.

It should be understood that a vehicle such as vehicle 10 may have some form of a drive force unit (e.g., an engine, motor generators (MGs)), a battery, a transmission, a memory, an electronic control unit (ECU), and/or other components not necessarily illustrated herein. However, some relevant components are described below.

FIG. 1 illustrates an example autonomous control system 100 that may be used to autonomously control vehicle 10. Autonomous control system 100 may be installed in vehicle 10, and executes autonomous control of vehicle 10. As described herein, autonomous control can refer to control that executes driving/assistive driving operations such as acceleration, deceleration, and/or steering of a vehicle, generally movement of the vehicle, without depending or relying on driving operations/directions by a driver or operator of the vehicle.

As an example, autonomous control may include a lane keeping assist control where a steering wheel (not shown) is steered automatically (namely, without depending on a steering operation by the driver) such that vehicle 10 does not depart from a running lane. That is, the steering wheel is automatically operated/controlled such that vehicle 10 runs along the running lane, even when the driver does not perform any steering operation.

An ECU 110 may include circuitry to control the above aspects of vehicle operation. ECU 150 may include, for example, a microcomputer that includes a one or more processing units (e.g., microprocessors), memory storage (e.g., RAM, ROM, etc.), and I/O devices. ECU 110 may execute instructions stored in memory to control one or more electrical systems or subsystems in the vehicle. ECU 110 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

In the example shown in FIG. 1, autonomous control system 100 is provided with a plurality of sensors, such as one or more external sensors (one of which may be a camera 102, a Global Positioning System (GPS) reception unit (not shown), an internal sensor(s) (not shown), a map database 104, a navigation system 106, an HMI (Human Machine Interface) 108, and actuators 114. Autonomous control system 100 may communicate with ECU 110, or in some embodiments (may be implemented with its own ECU).

In the example shown in FIG. 1, the aforementioned external sensors, one of which may be embodied as camera 102, can be detectors or part of a detector(s) that detect external circumstances such as surrounding information of vehicle 10.

Camera 102 may be an imaging device that images the external circumstances surrounding vehicle 10. For example, camera 102 can be provided on a back side of a front windshield of vehicle 10, and camera 102 may be a monocular camera or a stereo camera, a still camera, a video camera, a color camera, etc. Vehicle 10 may have multiple cameras located in different areas of vehicle 10. Such cameras, including camera 102 may output, to the ECU 110, image information regarding the external circumstances surrounding vehicle 10. In the context of traffic light perception, camera 102 may detect and capture one or more images that ultimately may be determined to be a traffic light that is processed to determine the status/characteristics of the traffic light.

A map database 104 may be a database including map information. The map database 104 is implemented, for example, in a disk drive or other memory installed in vehicle 10. The map information may include road position information, road shape information, intersection position information, and fork position information, for example. The road shape information may include information regarding a road type such as a curve and a straight line, and a curvature angle of the curve. When autonomous control system 100 uses a Simultaneous Localization and Mapping (SLAM) technology or position information of blocking structural objects such as buildings and walls, the map information may further include an output signal from an external sensor, such as camera 102. In some embodiments, map database 104 may be a remote data base or repository with which vehicle 10 communicates.

Navigation system 106 may be a component or series of interoperating components that guides vehicle 10 to a destination on a map designated in map database 104, for example. That is, navigation system 106 may calculate a route followed or to be followed by vehicle 10, based on the position information of vehicle 10 measured by the aforementioned GPS reception unit and map information of map database 104. The route may indicate a running lane of a section(s) of roadway in which vehicle 10 traverses, for example. Navigation system 106 calculates a target route from the current position of vehicle 10 to the destination, and notifies a passenger of vehicle 10, for example, of the target route through a display, e.g., a display of a head unit, which may be an embodiment of HMI 108. The navigation system 106 outputs, to the ECU 110, information of the target route for vehicle 10. In some embodiments, navigation system 106 may use information stored in a remote database, like map database 104, and/or some information processing center with which vehicle 10 can communicate. A part of the processing executed by the navigation system 106 may be executed remotely as well.

ECU 110 may execute autonomous control of the vehicle, and may include, among other components, a control unit 112. Control unit 112 can autonomously control vehicle 10 based on the navigation plan generated by a navigation plan generation unit (not shown). The control unit 112 outputs, to the actuators 114, control signals according to the navigation plan. That is, the control unit 112 controls actuators 114 based on the navigation plan, and thereby autonomously controls one or more aspects of vehicle 10 to traverse one or more roadways in accordance with the navigation plan. Actuators 114 may comprise one or more interfaces to, e.g., drive units of vehicle 10, e.g., a throttle that controls engine operation.

Figure 2A:
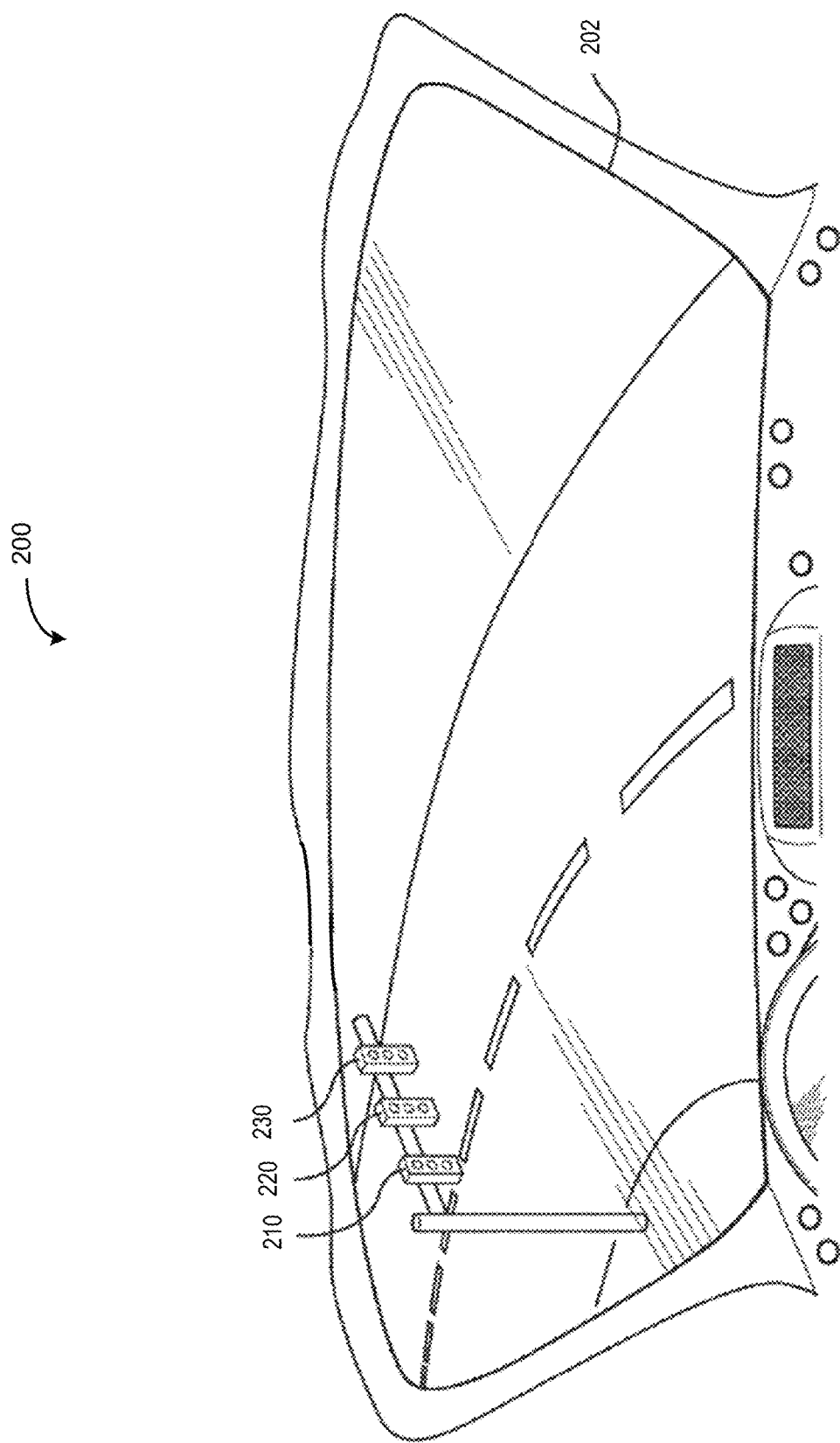
FIG. 2A is an example view of traffic lights from a vehicle.

FIG. 2A is an example view 200 from a vehicle, such as vehicle 10 of FIG. 1, approaching traffic signals 210, 220, 230 at a curve in a road on which vehicle 10 is travelling. A camera or other image capture device, such as camera 102, may capture an image 202 of the upcoming roadway. Image 202 may reflect the one or more traffic signals 210, 220, 230. A traffic light detection component or detector (described below) of vehicle 10 may create a region of interest in an attempt to detect the state of the traffic signals 210, 220, 230. In this case, three regions of interest about/proximately surrounding traffic signals 210, 220, 230 may be created by the traffic light detection component. Regions of interest may be determined based on previously stored information about the traffic lights depicted in image 150. For example, locations of traffic signals 210, 220, 230 may have been previously mapped and regions of interest may have been associated with locations on the map.

It should be noted that traffic signals can differ from region to region, municipality to municipality, country to country, etc. For example, traffic signals in the United States tend to comprise a generally vertical (although sometimes horizontal) arrangement of three bulbs (or light emitting components such as light emitting diode (LED) arrays arranged in a round, bulb-like shape) one atop another. Typically a red bulb is the top-most bulb, a yellow bulb is the middle bulb, and a green bulb is the bottom bulb. Such traffic signals may cycle through an illumination sequence that can go, e.g., from red (indicating oncoming vehicles should stop) to green (indicating oncoming vehicles may go, e.g., straight) to yellow (indicating oncoming vehicles should slow down to a stop). This cycle may then repeat. Some traffic signals may include another bulb/light such as an green arrow (indicating to oncoming vehicle to turn in the direction of the green arrow). Some traffic signals may only have one bulb/light, such as a red bulb that blinks (indicating that oncoming vehicles should stop, but are then allowed to proceed after checking cross-traffic).

In other countries, such as Japan, for example, traffic signals may be generally oriented in a horizontal fashion, and may include multiple, e.g., two, rows of bulbs/lights. For example, a top row of the traffic signal may have three bulbs or light arrays, the left-most being a green bulb, the middle being a yellow bulb, and the right-most being a red bulb. Below that, a second row, may comprise, e.g., four bulbs/lights. The left-most bulb may be a green diagonal left-down pointing arrow. The next bulb may be a green diagonal left-up pointing arrow. The next bulb may be a green up pointing arrow. The right-most bulb may be a green right-pointing arrow.

Figure 2B:
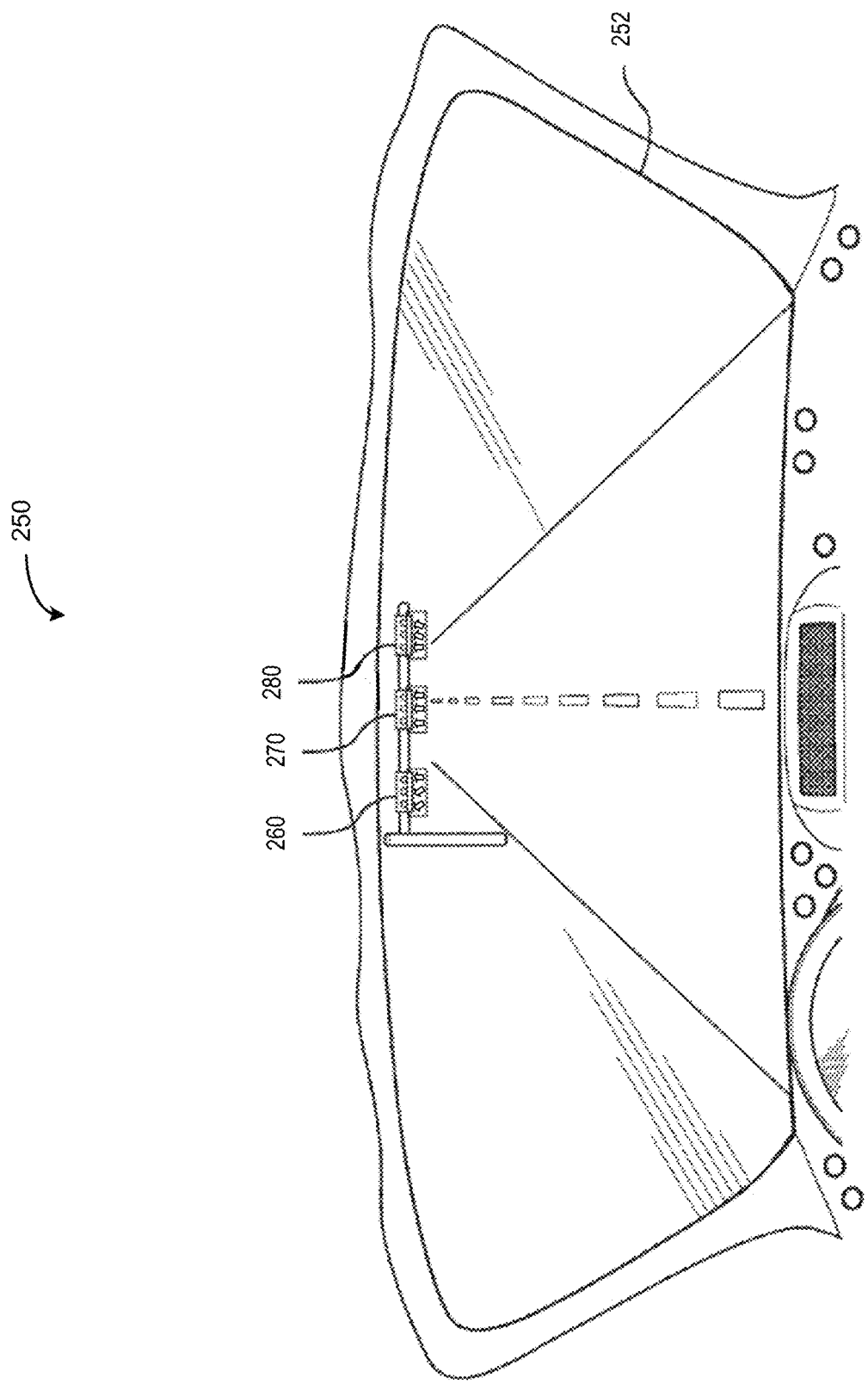
FIG. 2B is another example view of traffic lights from a vehicle.

FIG. 2B is an example view 250 from a vehicle, such as vehicle 10 of FIG. 1, of approaching traffic signals 260, 270, 280 at a curve in a road on which vehicle 10 is travelling. A camera or other image capture device, such as camera 102, may capture an image 252 of the upcoming roadway. Image 252 may reflect the one or more traffic signals 260, 270, 280. A traffic light detection component (described below) of vehicle 10 may create a region of interest in an attempt to detect the state of the traffic signals 260, 270, 280. In this case, three regions of interest about/proximately surrounding traffic signals 260, 270, 280 may be created by the traffic light detection component. Regions of interest may be determined based on previously stored information about the traffic lights depicted in image 252. For example, locations of traffic signals 260, 270, 280 may have been previously mapped and regions of interest may have been associated with locations on the map. Here, traffic signals 260, 270, 280 have characteristics that differ from traffic signals 210, 220, 230, e.g., traffic signals 260, 270, 280 are oriented horizontally as opposed to vertically, and have two rows of bulbs/lights. Moreover, whereas traffic signals 210, 220, 230 comprise solid, round bulb shapes, traffic signals 260, 270, 280 comprise both solid, round, bulb shapes, and additionally, solid, directional arrow shapes.

As will be described below, perceiving traffic signals, such as traffic signals 210, 220, 230, 260, 270, and 280 may involve detecting various characteristics of the traffic signals (upon a determination that a detected object is a traffic signal), and determining certain characteristics indicative of the command(s) the traffic signal intends to relay to vehicles. Shape/geometry as described above with reference to FIGS. 2A and 2B, is one such characteristic, and as alluded to above and further described herein, other characteristics may include color, whether or not a traffic bulb is projecting solid light or is flashing, etc.

Machine learning generally involves developing a model, i.e., a mathematical representation of a real-world process, where the model is able to make predictions about that real-world process. To generate a model, typically, training data is provided or input into a machine learning algorithm by means of a known dataset before application of the model in real-world scenarios or situations. In supervised learning, one method or subset of machine learning, applicable machine learning algorithms are trained on data that has been labeled or classified or otherwise categorized. Therefore, successful implementation of such machine learning algorithms depends on the accuracy with which that labeling/annotation/classification is performed. Ultimately, a model should be able to accurately predict/estimate what a detected traffic signal is conveying, whether in the real world, in a simulation, etc.

Typically, when labeling or annotation is required in supervised learning, such as is the case when trying to identify images, video, or other data that involves some human sensory response, such labeling/annotating is typically performed by human labelers. However, when significant amounts of data are at issue, as is the case when using machine learning to develop and train models that are able to perceive traffic signals, the amount of labeling/annotating can be commensurately significant, and thus automated annotation can be useful. Moreover, balanced data collection is desirable in machine learning to avoid any model bias, i.e., for each category or data, it is desirable to have an equivalent amount of data. In machine learning, "rare" classes or categories associated with less data tend to be ignored by models, whereas a goal in supervised learning is to penalize the model for predicting an incorrect state, e.g., perceiving a traffic light as commanding an oncoming vehicle to stop, when in actuality, the traffic light was commanding oncoming vehicles go straight. This results in better training of the model.

Figure 3:
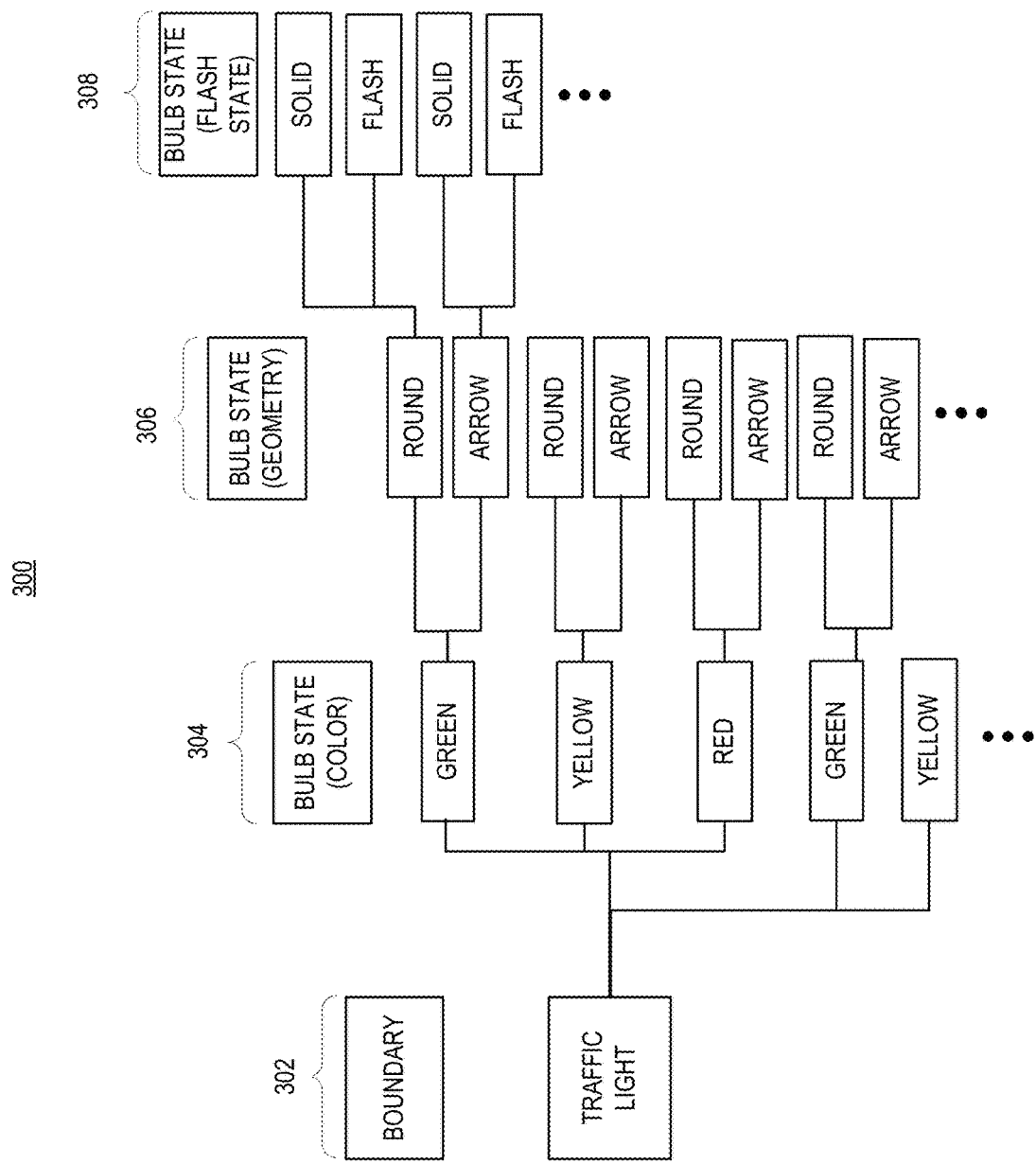
FIG. 3 is a graphical representation of an example hierarchical ontology for traffic light detection and processing in accordance with various embodiments.

FIG. 3 illustrates an example hierarchical ontology 300 that may be used in the modeling and training of a traffic light perception system. As has already been described understanding the command(s) one or more traffic signals are conveying to vehicles can be a complicated endeavor. Traffic signals may control multiple lanes of traffic, each traffic signal may have multiple bulbs or bulb groups, where one or more bulb groups may be used to control transitions (red to green, green to yellow, etc.). One or more lights, bulb groups, shapes, etc. are factors to consider when vehicle 10 wishes to traverse an intersection, for example.

Hierarchical ontology 300 includes multiple levels of traffic signal characteristics and corresponding states. A boundary (or bounding box) level 302 corresponds to detecting whether or not some portion of a captured image of a view, e.g., views 200 (FIG. 2A) or 250 (FIG. 2B) includes a traffic light. Bounding boxes/sliding windows can be "slid" across an image and a classifier can check to see if the content within the bounding box is a traffic light.

A traffic light bulb's color state 304 may be another level specified in the hierarchical ontology 300, and can reflect bulb color characteristics of a bulb that's illuminated, e.g., green, yellow, or red. As alluded to above, in some regions, only one bulb of a traffic signal will be illuminated, and so upon detecting the existence of and labeling an image as a traffic light, the next detection may be a detector detecting the color associated with an illuminated bulb in the detected traffic signal. However, in other regions, multiple bulbs may be illuminated. Again, in Japan, traffic signals may have multiple rows of bulbs, with, e.g., two bulbs, one in each row, being illuminated. Accordingly, hierarchical ontology 300 can account for multiple child bulb states/states associated with multiple bulb groups, etc.

A next level in the hierarchical ontology 300 may be a bulb's geometry or geometric state, e.g., whether the bulb shape is round, an arrow, a particular arrow, an outline of a pedestrian (not shown), a direction of the arrow (also not shown), etc. In this way, an image containing what has been determined/labeled to be a traffic light, and subsequent to detecting/labeling the image as representing a traffic light with an illuminated green bulb, for example, a detector can determine the shape of the illuminated bulb(s).

Yet another characteristic of a traffic signal that may be reflected in hierarchical ontology 300 may be the bulb's flashing state," i.e., whether the bulb that is illuminated is flashing or is solid. As should be understood, certain traffic signals direct vehicular traffic through the use, not only of color and shape, but also by whether or not a traffic light bulb is blinking or not (solid). For example, in the United States, a flashing green bulb on a traffic signal may indicate that that the traffic signal is pedestrian activated, therefore signaling to oncoming vehicles that caution should be used in the event the oncoming vehicles must stop to let a pedestrian cross. In Canada, a flashing green bulb signals to an oncoming vehicle that it is permitted to turn left prior to opposing traffic being allowed to enter the intersection.

It should be understood that hierarchical ontology 300 is not meant to be a limiting embodiment. That is, there may be other ways in which to structure and build a hierarchical ontology representative of traffic signal operation. Again, it is the hierarchical structure spread across multiple levels representative of different traffic light/traffic light component characteristics that allows the advantages of various embodiments described herein to be realized. For example, the hierarchical ontology 300 illustrated in FIG. 3 treats bulb geometry is a single level, but in other embodiments, traffic light perception may be more accurate if bulb geometry is handled as multiple levels. That is, in some embodiments, another hierarchical ontology may include bulb geometry as illustrated in FIG. 3 to include round and arrow labels/classes, while a next level is defined for arrow direction that is used to characterize the direction in which detected arrows are pointing.

An advantage of a hierarchical ontology, such as hierarchical ontology 300, may include the ability to use a model generated and trained using hierarchical ontology 300 across disparate traffic light systems. That is, the model can iterate through different levels of the hierarchical ontology as appropriate for different traffic light systems. In some scenarios, a model may be used for only coarse-grained traffic light prediction or estimation, e.g., a simple go or no-go prediction. However, in other scenarios, a model may be used for fine-grained traffic light prediction, where more levels or states may be detected and labeled. That is, instead of a simple go/no-go prediction, the prediction may include information regarding that the go/no-go prediction is a go (green) turn left (green left-pointing arrow) with caution (green left-pointing flashing arrow).

Additionally, an as can be appreciated, the nature of this hierarchical ontology representation applied to traffic signals is compositional (i.e., the traffic light is being decomposed/broken down in multiple component parts/aspects, such as different colors, shapes, etc.) Thus, (accurate) models can be trained and generated for each one of these compositional aspects, e.g., a model for traffic light bulb color, a model for traffic light bub geometry, a model for traffic bulb frequency, etc. Accordingly, the applicable models that comport with the characteristics of a traffic signal/traffic signal system for which a user wishes to make predictions can be combined into an aggregate model.

The compositional nature of hierarchical ontologies such as hierarchical ontology 300 also allows for more efficient data collection. That is, where different traffic signal systems, e.g., the United States and Japan, exist (as described above), common aspects of the traffic signal systems can be leveraged through the use of models built on the same hierarchical ontology. For example, traffic signals in the United States and Japan both have common shapes (e.g., round bulbs and arrow-shaped bulbs), and both have common colors (red, yellow, green). Thus, the data used to train a model based on common bulb shapes and colors is applicable to traffic signal systems in both the United States and Japan. Additional training data need not be obtained for one or the other when common traffic signal characteristics/components/aspects exist.

Further still, the use of a hierarchical ontology, such as hierarchical ontology 300 to generate and train traffic signal perception models can be advantageous because traffic signal perception involves temporal transitions. That is, once hierarchical ontology 300 has been used to model the various aspects of a traffic signal, e.g., two or more of bulb color, bulb geometry, bulb frequency, etc., transitions from states involving such traffic signal characteristics more easily and efficiently using logical or state machine representations.

Figure 4A:
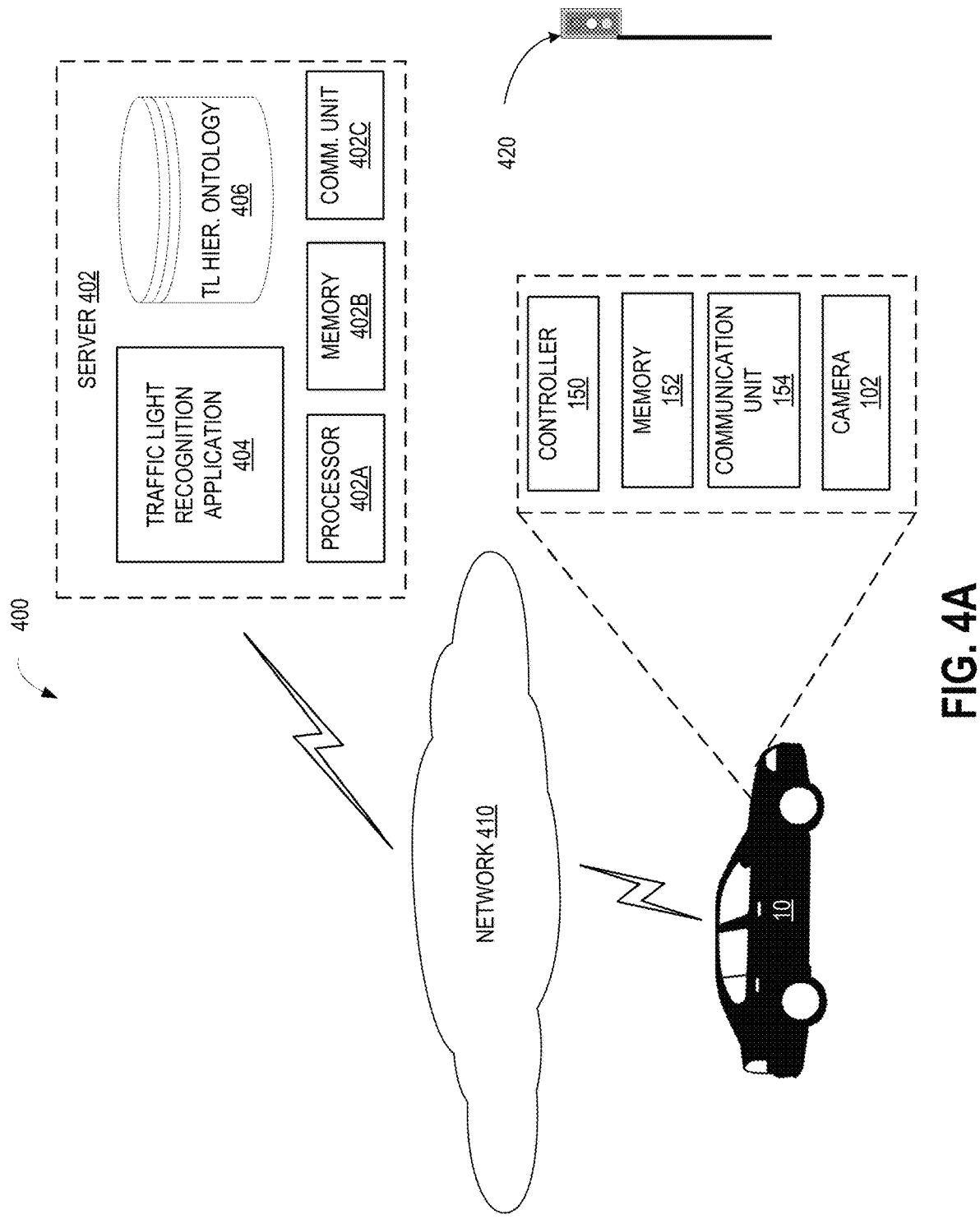
FIG. 4A illustrates an example traffic light detection and processing system in accordance with various embodiments.
Figure 4B:
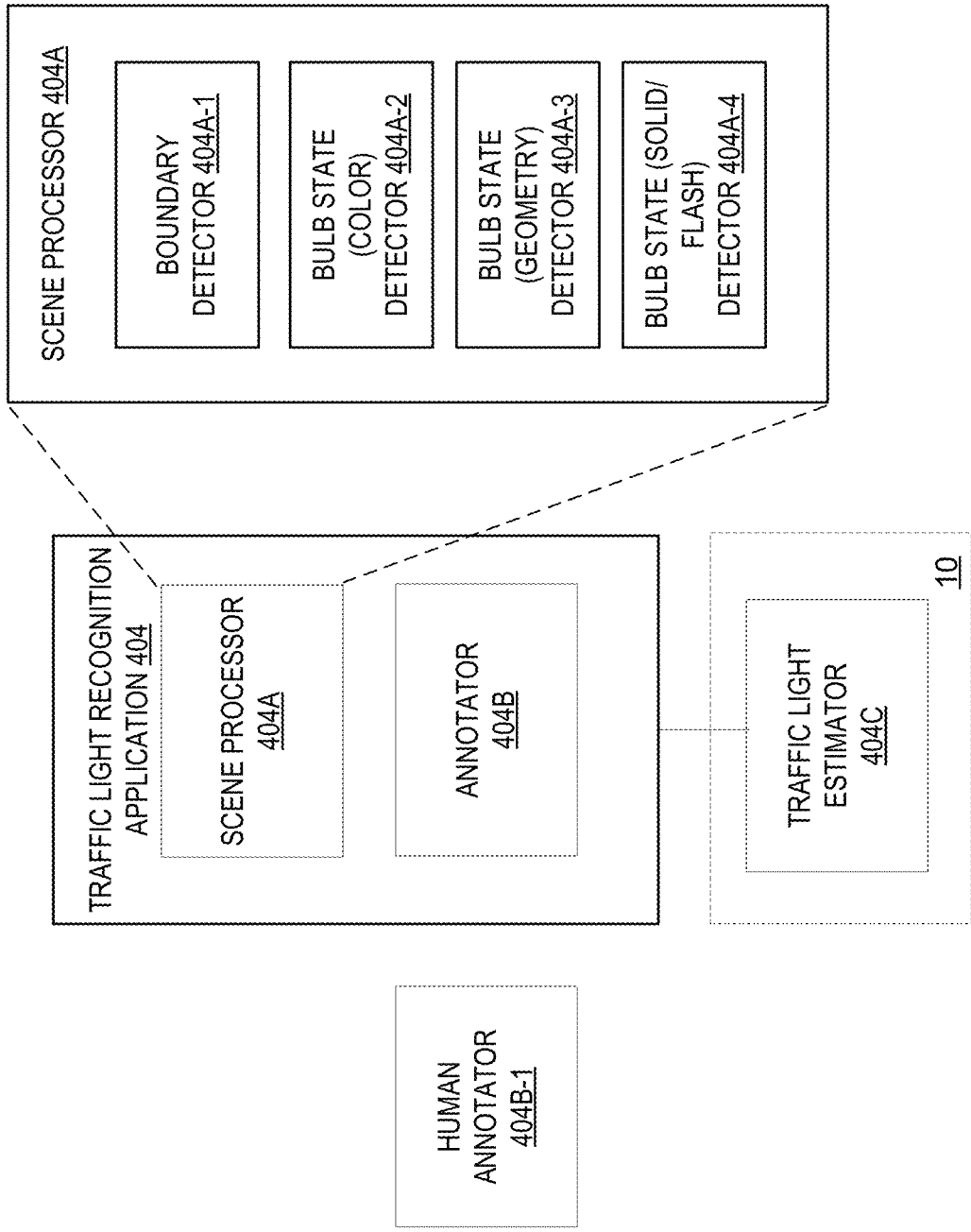
FIG. 4B illustrates aspects of the example traffic light detection and processing system of FIG. 4A in greater detail.

FIGS. 4A and 4B illustrate a system 400 and component parts of the system 400 for modeling/training using a hierarchical ontology to perceive traffic signals in accordance with one embodiment. System 400 includes a server 402, vehicle 10, and a network 410 over which vehicle 10 may communicate with server 402. It should be noted that in this embodiment, vehicle 10 may be collecting data by traversing various roadways, the collected data including images of traffic signals, one of which may be traffic signal 420. As previously discussed, vehicle 10 may include one or more sensors 102, at least one of which may be a camera that can capture images of traffic signals, such as traffic signal 420. It should be understood that system 400 is an example, and system 400 in addition to other systems contemplated in accordance with the present disclosure may include additional and/or fewer components, may combine components, and/or divide one or more of the components into additional components, etc. For example, system 400 may include any number of vehicles and servers.

Network 410 can be a conventional type, wired or wireless, and may have numerous different configurations including a star configuration, token ring configuration, or other configurations. Furthermore, the network 410 may include one or more local area networks (LAN), wide area networks (WAN) (e.g., the Internet), public networks, private networks, virtual networks, peer-to-peer networks, and/or other interconnected data paths across which multiple devices may communicate. For instance, the network 410 may include a vehicle-to-vehicle network, a vehicle-to-infrastructure/infrastructure-to-vehicle network, etc.

The network 410 may also be coupled to or include portions of a telecommunications network for sending data in a variety of different communication protocols. In some embodiments, the network 410 includes Bluetooth communication networks or a cellular communications network for sending and receiving data including via short messaging service (SMS), multimedia messaging service (MMS), hypertext transfer protocol (HTTP), direct data connection, WAP, email, etc. In some embodiments, the network 410 is a wireless network using a connection such as DSRC, WAVE, 802.11p, a 3G, 4G, 5G+ network, WiFi™, or any other wireless networks. Although FIG. 4A illustrates a single block for the network 410 that couples to the server 402 and to vehicle 10, it should be understood that the network 410 may in practice, comprise any number of combination of networks, as noted above.

The server 402 can include a hardware and/or virtual server that includes a processor 402A, a memory 402B, and network communication capabilities (e.g., a communication unit 402C). The server 402 may be communicatively coupled to the network 410. In some embodiments, the server 402 can send and receive data to and from vehicle 10 (as well as other servers, data repositories, and the like, e.g., map data from map database 104 of FIG. 1). The server 402 may include an instance of a traffic light recognition application 404 and a hierarchical ontology database 406 that may reflect hierarchical ontology 300 (FIG. 3).

The hierarchical ontology database 406 may store terminology data for describing road scene situation. In FIG. 1, the server 406 is shown as including the hierarchical ontology database 406, however it should be understood that vehicle 10 and/or another component of the system 400, may additionally and/or alternatively store the terminology data. For instance, vehicle 10 may include an instance of the hierarchical ontology database 406, may cache data from the hierarchical ontology database 406 (e.g., download the terminology data at various intervals), etc. For instance, the terminology data may be pre-stored/installed vehicle 10, stored and/or refreshed upon setup or first use, replicated at various intervals, etc. In further embodiments, data from the hierarchical ontology database 406 may be requested/downloaded at runtime. Other suitable variations are also possible and contemplated.

The terminology data may reflect a language framework. Referring back to FIG. 3, the hierarchical ontology data may include predefined semantic terms for describing traffic signal characteristics (red, yellow, green, round, arrow, solid, etc.). In some embodiments, hierarchical ontology database 406 may include or be part of a database management system (DBMS) for storing and providing access to data.

Vehicle 10 includes a computing device having memory 152, a processor 150, and a communication unit 154. Processor 150 maybe an embodiment of ECU 150 (FIG. 1), or other suitable processor, which is coupled to other components of vehicle 10, such as one or more sensors, actuators, motivators, etc. Vehicle 10 may send and receive data to and from server 402.

In this example, traffic signal 420 may comprise a vertically-oriented traffic signal having three bulbs that upon illumination reflect the colors red, yellow, and green (from top to bottom). Memory 152 of vehicle 10 may capture data, e.g., images (video, still) or frames, captured by camera 102 of traffic signal 420, which may be provided to server 402, and in particular traffic light recognition application 404 vis-à-vis memory 402B, for example. It should be understood that in some configurations, the traffic light recognition application 404 may be distributed over the network 410 on disparate devices in disparate locations, in which case these disparate devices may each include an instance of the traffic light recognition application 404

As shown in FIG. 4B, which depicts a block diagram of an example traffic light recognition application 404, the traffic light recognition application 404 may include at least a scene processor 404A, and an annotator 404B, and a traffic light estimator 404C operationalized in a vehicle, e.g., vehicle 10, may be operatively connected thereto. It should be understood that the traffic light recognition application 404 may include additional components such as, but not limited to, a configuration engine, a training engine, an encryption engine, etc., and/or these various components may be combined into a single engine or divided into additional engines.

Scene processor 404A, annotator 404B, and traffic light estimator 404C may be implemented as software, hardware, or a combination of the foregoing. In some embodiments, traffic light estimator 404C may be controlled by/operated by control unit 112 and/or ECU 110. As described above, some machine learning systems/methodologies may include human labelers/annotators as part of data processing/model training. A human annotator 404B-1 is illustrated in FIG. 4B. It should be understood that supervised machine learning involves a model memorizing or learning from real-world, e.g., human demonstrations to achieve pattern recognition. Accordingly, annotator 404B-1 may annotate, e.g., assign a category, label, type, or other relevant designation or identification to a data element, e.g., image, which can then be used to train the model. The use of a hierarchical ontology in accordance with various embodiments allows the annotation pipeline to be divided into multiple stages, e.g., traffic light boundary, bulb boundary/color/geometry, to reduce the error rate and potentially leverage previously-trained models to perform auto-labeling/annotation to reduce the cost of implementing/performance of the annotation pipeline.

Scene processor 404A may be communicatively coupled to camera 102 and/or memory 152 to receive the captured image data, and may process the image data to extract various types of scene (in this context, traffic light) information, i.e., one or more of the aforementioned traffic light characteristics/aspects. The image data may include images captured at a certain rate/interval (e.g., every 0.5 s, 1 s, 3 s, etc.) as vehicle 10 travels along a road. In some embodiments, the capturing interval may vary depending on particular time of the day and/or scene-level context. For example, camera 102 may capture traffic signals images more frequently during peak hours, for example, 8 am to 10 am and 5 pm to 7 pm on weekdays. In some embodiments, camera 102 may adjust the capturing interval based on the scene-level context determined by the traffic light recognition application 404. For example, camera 102 may capture traffic signal information every 0.2 s when heavy traffic and/or congestion occurs, and/or in accordance with transition sequences that can change according to traffic. In further embodiments, the capture rate/interval may be a standard frame rate.

In some embodiments, the scene processor 404A may include one or more components for processing the road scene data to determine one or more scene information. As illustrated in FIG. 7, an example scene processor 404A for processing a road scene may include a boundary detector 404A-1, a bulb color detector 404A-2, a bulb geometry detector 404A-3, and a bulb flashing state detector 404A-4.

In some embodiments, the scene processor 404A may extract one or more parameters from the image sensor data, etc. using a vision algorithm. For example, the boundary detector 404A-1 may identify a boundary within which a traffic light may be detected. In some embodiments, the bulb color detector 404A-2 may process the input image data to determine an illumination color of one or more bulbs of a detected traffic light. In some embodiments, the bulb geometry detector 404A-3 may determine a geometry of a particular bulb(s) in a detected traffic light, e.g., traffic light 402.

As noted above, as part of making such determinations, annotators, e.g., human annotator 404B-1, may label or classify the data accordingly. For example, upon analyzing captured image data of a traffic signal, such as traffic signal 420, and determining that a green bulb is illuminated, that image may be labeled as such. As also noted above, because a hierarchical ontology is developed and used in accordance with various embodiments, automatic annotation may be performed, e.g., by annotator 404B. That is, depending on the labeling of or determinations regarding states/conditions of, e.g., preceding levels or characteristics in the hierarchical ontology, a state/condition/characteristic of the traffic signal can be assumed, negating the need for human annotator 404B-1 (at least in some stages of data processing).

Annotator 404B may output an annotated dataset to train the models in/of traffic light estimator 404C. Traffic light estimator 404C may then be operative while a vehicle, e.g., vehicle 10 is in use to infer the state(s) of traffic lights that are encountered, i.e., estimate or predict the state/condition of a detected traffic signal. In some embodiments, traffic light estimator 404C may be implemented in/as part of a simulation, or any other system/context in which traffic light estimation is to occur.

It should be noted that traffic light estimator 404C can be used to bootstrap prediction of traffic light perception. For example, fine-grained model prediction/estimation can be compared with high-level annotations that act as a sanity check/feedback comparison. In some embodiments the system 400 can use preceding labels to bootstrap later annotations and at differing levels of the hierarchical ontology. For example, if a first annotation creates a conflict or impossibility with a second annotation, depending on the hierarchical ontology structure/order, an assumption(s) can be made regarding the correctness of either the first or second annotation.

Figure 5:
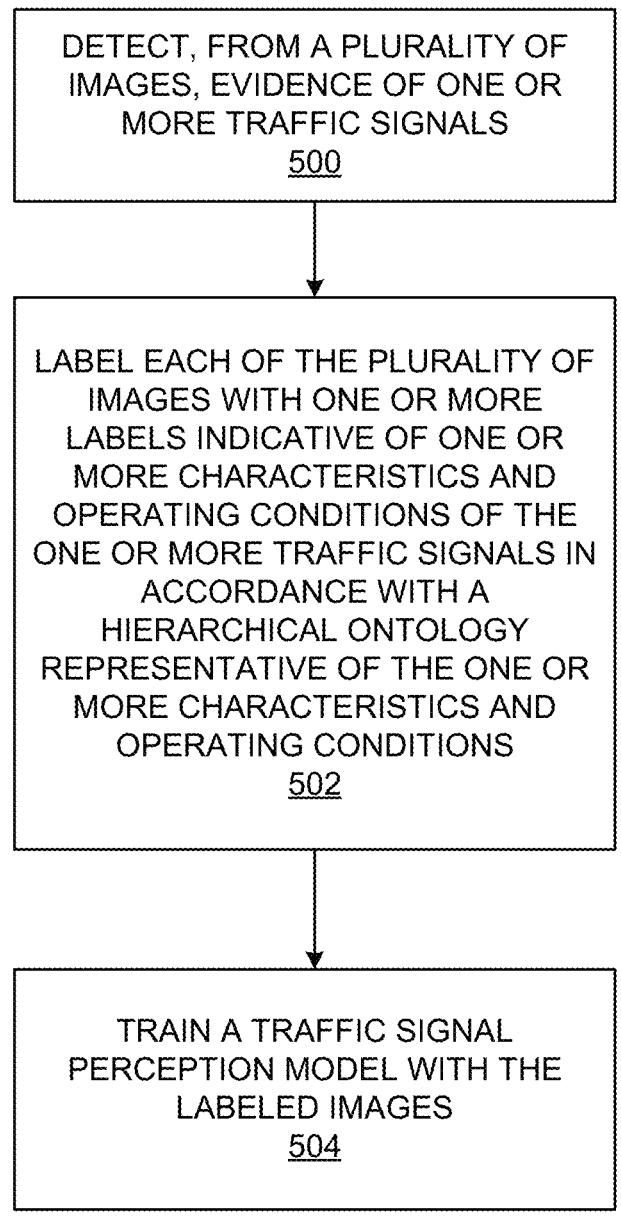
FIG. 5 is a flow chart illustrating traffic light detection and processing in accordance with one embodiment.

FIG. 5 is a flow chart illustrating example operations that may be performed to train a traffic signal detection and prediction/recognition machine learning model that can then recognize traffic light states encountered during vehicle use.

At operation 500, evidence of one or more traffic signals may be detected from a plurality of images. As noted above, one or more image datasets including potential evidence of the existence of traffic signals may be analyzed to determine if in fact, traffic signals are present therein. Boundaries can be specified to assist in making this determination as also described above.

At operation 502, each of the plurality of images can be labeled with one or more labels indicative of one or more characteristics and operating conditions of the one or more traffic signals in accordance with a hierarchical ontology representative of the one or more characteristics and operating conditions. As discussed above, the use of a hierarchical ontology to represent various traffic light characteristic (e.g., states, transitions, colors, shapes, etc.) allows for structured and/or automated annotation (in supervised machine learning), as well as the ability to bootstrap traffic light prediction. The hierarchical ontology structures traffic light characteristics, e.g., states, conditions, color, geometry, etc., and thus decomposes traffic light perception into multiple levels upon which labeling can be based (including auto-labeling) and traffic light prediction/recognition can be learned and applied.

At operation 504, a traffic signal perception model can be trained with the labeled images. The training of the traffic signal perception model can be made more efficient and accurate through the use of the hierarchical ontology. Moreover, traffic signal perception models trained in the disclosed manner can have broader applicability than has previously been possible.

A training framework that leverages a hierarchical ontology, as described herein, provides the ability to dynamically adjust the granularity of detection/prediction of traffic lights (e.g., only output traffic light state, outputs traffic light state and bulb boundary/color, output traffic light state and bulb boundary/color/geometry, etc. depending on vehicle system applications, and bootstrap predictions from different granularity levels (e.g., a traffic light state should not be a "GO" state if a red solid bulb is detected. Additionally, a set of tools and instructions are provided to efficiently create a set of annotations (which can be a large set) that is used to train a traffic light detection/prediction model. Human annotators may, given a traffic scene image, mark the location of all traffic lights in, e.g., an image of a captured scene and the bulb location within each traffic light in the form of a rectangular bounding box. For each bulb, they may annotate the "state" of the bulb (e.g., color, shape, and whether the bulb is flashing or solid). Once a relatively large dataset of human-labeled traffic images are collected, they can be used to train any suitable object detection model architecture, which may involve some slight modification to the hierarchical ontology.

It should be understood that the embodiments described herein are non-limiting examples. For example, although example traffic light systems described herein include more "standard" traffic lights including circular light/bulb indicators, as well as arrow indicators, various embodiments may be adapted to perceive traffic light systems that display text (e.g., "STOP" or "PROCEED"), other shapes (e.g., pedestrian walk/no walk indicators, wildlife crossing warnings, railroad crossing indicators), and the like.

Figure 6:
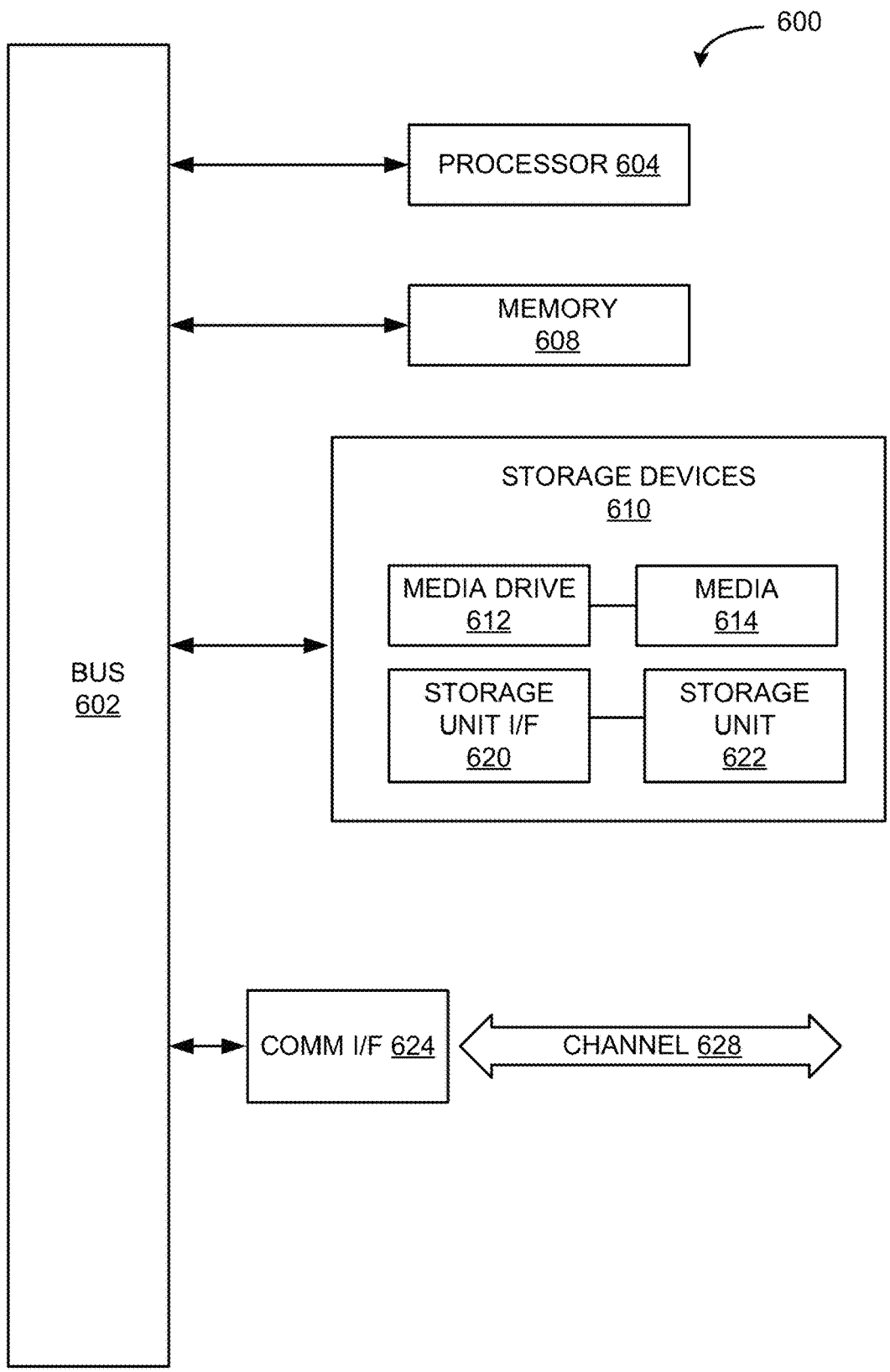
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    detecting, from a plurality of images, one or more illuminated traffic signals;
    labeling each of the plurality of images with one or more labels indicative of one or more characteristics and operating conditions of the one or more illuminated traffic signals in accordance with a hierarchical ontology, wherein the hierarchical ontology comprises a plurality of levels, the plurality of levels comprising:
        a first level corresponding to a first bulb state of one or more illuminated traffic signals;
        a second level corresponding to a second bulb state of one or more illuminated traffic signals; and
        a third level corresponding to a third bulb state of one or more illuminated traffic signals;
    validating a label associated with the third level of the hierarchical ontology based on a label associated with one or more of the first level and the second level of the hierarchical ontology; and
    training a traffic signal recognition model with the labeled images, wherein the traffic signal recognition model iterates through only those levels of the plurality of levels of the hierarchical ontology, necessary for traffic signal recognition.

2. The method of claim 1, wherein the plurality of levels comprises at least a boundary stage, and multiple light emitting component state stages.

3. The method of claim 2, wherein the boundary stage corresponds to the detection of evidence of the one or more illuminated traffic signals.

4. The method of claim 2, wherein one or more of each light emitting component state stage of the multiple light emitting component state stages comprises a plurality of light emitting component state groups.

5. The method of claim 1, wherein the labeling of each of the plurality of images comprises auto-labeling of at least a subset of the plurality of images based on labels regarding preceding levels of the plurality of levels.

6. The method of claim 1, further comprising operationalizing the traffic signal recognition model to generate traffic signal state predictions regarding encountered traffic signals during operation of a vehicle in which the traffic signal recognition model is implemented.

7. The method of claim 6, further comprising validating the traffic signal state predictions with the labeling of one or more of plurality of images.

8. The method of claim 1, further comprising:
validating a label associated with the second level of the hierarchical ontology based on a label associated with the first level of the hierarchical ontology.

9. The method of claim 1, wherein the traffic signal recognition model uses the second level for traffic signal recognition only when necessary, based on the first level, for traffic signal recognition, and wherein the traffic signal recognition model uses the third level for traffic signal recognition only when necessary, based on the second level, for traffic signal recognition.

10. The method of claim 1, wherein the first bulb state comprises a bulb color state, the second bulb state comprises a bulb geometry state, and the third bulb state comprises a bulb flashing state.

11. A vehicle including a traffic signal recognition system, comprising:
a camera;
a traffic signal estimator circuitry controlled by a control unit operative to:
receive images from the camera; and
analyze the received images in accordance with a traffic signal recognition model trained using labeled images, the labeled images comprising one or more labels indicative of one or more characteristics and operating conditions of the one or more traffic signals in accordance with a hierarchical ontology representative of the one or more characteristics and operating conditions, wherein the hierarchical ontology comprises at least a first level, a second level, and a third level, each corresponding to a different traffic signal characteristic only used when necessary for traffic signal recognition, wherein a label associated with the second level is validated based on a label associated with the first level and a label associated with the third level is validated based on a label associated with one or more of the first level and the second level.

12. The vehicle of claim 11, wherein the hierarchical ontology comprises a plurality of levels comprising at least a boundary stage, and multiple light emitting component state stages.

13. The vehicle of claim 12, wherein the boundary stage corresponds to a detection of evidence of the one or more traffic signals.

14. The vehicle of claim 11, wherein the first level, the second level, and the third level correspond to color state, a geometry state, and a flashing state, respectively.

15. The vehicle of claim 11, wherein the traffic signal state predictions are validated with labels of the labeled images.

16. The vehicle of claim 11, wherein the traffic signal recognition model uses the first level for traffic signal prediction at a highest level and further uses the second level, third level, or second and third level for traffic signal prediction only when necessary for traffic signal recognition at a lower level.

17. The vehicle of claim 16, wherein the first level comprises a stop or go prediction and an indication of direction and the second and third levels comprise information representative of color, state, shape, structure, or composition of the traffic signal.

* * * * *